(12) United States Patent
Hansen et al.

(10) Patent No.: US 11,841,459 B2
(45) Date of Patent: Dec. 12, 2023

(54) METHOD OF MONITORING A PROTECTED ZONE

(71) Applicant: SICK AG, Waldkirch/Breisgau (DE)

(72) Inventors: Christoph Hansen, Waldkirch (DE); Lars Schubert, Waldkirch (DE)

(73) Assignee: SICK AG, Waldkirch/Breisgau (DE)

( * ) Notice: Subject to any disclaimer, the term of this patent is extended or adjusted under 35 U.S.C. 154(b) by 127 days.

(21) Appl. No.: 16/750,653

(22) Filed: Jan. 23, 2020

(65) Prior Publication Data

US 2020/0241538 A1    Jul. 30, 2020

(30) Foreign Application Priority Data

Jan. 24, 2019   (DE) .......................... 102019101737.8

(51) Int. Cl.
| | |
|---|---|
| *G01S 7/48* | (2006.01) |
| *G05D 1/00* | (2006.01) |
| *G05D 1/02* | (2020.01) |
| *G06F 18/214* | (2023.01) |
| *G06V 20/56* | (2022.01) |
| *G06V 20/58* | (2022.01) |

(52) U.S. Cl.
CPC .......... *G01S 7/4802* (2013.01); *G05D 1/0088* (2013.01); *G05D 1/0214* (2013.01); *G06F 18/214* (2023.01); *G06V 20/56* (2022.01); *G05D 2201/0213* (2013.01); *G06V 20/58* (2022.01)

(58) Field of Classification Search
CPC .............. G05D 1/0214; G05D 1/0088; G05D 2201/0213; G06K 9/00805; G06K 9/6256
USPC ......................................................... 701/23
See application file for complete search history.

(56) References Cited

U.S. PATENT DOCUMENTS

| | | | |
|---|---|---|---|
| 2009/0310117 A1* | 12/2009 | Pook ....................... | G01S 17/93 356/4.01 |
| 2011/0087406 A1* | 4/2011 | Barth ....................... | B60Q 1/48 701/41 |
| 2017/0307746 A1* | 10/2017 | Rohani .................... | G01S 13/42 |
| 2018/0025640 A1* | 1/2018 | Micks ................ | G06K 9/00812 340/932.2 |
| 2018/0089616 A1* | 3/2018 | Jacobus ............... | G05D 1/0246 |

(Continued)

FOREIGN PATENT DOCUMENTS

| | | |
|---|---|---|
| DE | 4405376 C1 | 2/1995 |
| DE | 102010036775 A1 | 2/2012 |

(Continued)

OTHER PUBLICATIONS

English Translation for DE102013015348A1 (Year: 2021).*

(Continued)

*Primary Examiner* — Mahmoud S Ismail
(74) *Attorney, Agent, or Firm* — Nath, Goldberg & Meyer; Jerald L. Meyer

(57) ABSTRACT

A method of monitoring a protected zone of a vehicle, wherein the protected zone is bounded at least regionally by a boundary contour, comprises the following steps:
 positioning the vehicle at a teaching zone comprising the boundary contour;
 teaching a reference contour by means of measuring the boundary contour by an environmental sensor arranged at the vehicle; and
 monitoring the protected zone on the basis of the reference contour and on measured values detected by the environmental sensor.

20 Claims, 6 Drawing Sheets

(56) References Cited

U.S. PATENT DOCUMENTS

2019/0129425 A1* 5/2019 Drexler .................. B25J 9/1676
2019/0381935 A1* 12/2019 Konstantin ........... B60W 50/14

FOREIGN PATENT DOCUMENTS

DE    102013015348 A1 *  4/2014  ......... B62D 15/0285
DE    102013015348 A1     4/2014
EP        3237984 B1     12/2018

OTHER PUBLICATIONS

Ho Gi Jung, Dong Suk Kim, Pal Joo Yoon and Jaihie Kim, "Parking Slot Markings Recognition for Automatic Parking Assist System", 2006 IEEE Intelligent Vehicles Symposium, Tokyo, 2006, pp. 106-113, doi: 10.1109/IVS.2006.1689613.

Jin Xu, Guang Chen and Ming Xie, "Vision-guided automatic parking for smart car", Proceedings of the IEEE Intelligent Vehicles Symposium 2000 (Cat. No. 00TH8511), Dearborn, MI, USAS, 2000, pp. 725-730, doi: 10.1109/IVS.2000.898435.

Sick AG: Technical Description: LMS200/211/221/291 Laser Measurement Systems, Sick AG Waldkirch 2006.

D. Wittmann, F. Chucholowski and M. Lienkamp, "Improving lidar data evaluation for object detection and tracking using a priori knowledge and sensorfusion", 2014 11th International Conference on Informatics in Control, Automation and Robotics (ICINCO), Vienna, 2014, pp. 794-801, doi: 10.5220/0005117707940801.

Wolfgang Schulz. Anwendung und Vergleich von Algorithmen zur sicherheitsgerichteten Auswertung von 2D Laserscanner-Entfernungsdaten, 2005. Bachelor Thesis, Department of Computer Science, Bonn-Rhein-Sieg University of Applied Sciences and English Abstract thereof.

Notice dated Nov. 21, 2019 issued in corresponding German Application No. 10 2019 101 737.8.

European Search Report dated Jun. 22, 2020 corresponding to application No. 20153453.4-1206.

Ho Gi Jung et al: "Parking Slot Markings Recognition for Automatic Parking Assist System", 2006 IEEE Intelligent Vehicles Symposium: Meguro-Ju, Japan, Jun. 13-15, 2006, IEEE, Piscataway, NJ, USA, Jun. 13, 2006 (Jun. 13, 2006), pp. 106-113, XP010936998, ISBN: 978-4-901122-86-3 * paragraphs [0003]-[0004]; Figure 6 *.

Jin Xu et al: "Vision-guided automatic parking for smart car", Intelligent Vehicles Symposium, 2000. IV 2000. Proceedings of the IEEE Dearborn, MI, USA Oct. 3-5, 2000, Piscataway, NJ, US, IEEE, US, Oct. 3, 2000 (Oct. 3, 2000), pp. 725-730, XP010529024, DOI: 10.1109/IVS.2000.898435, ISBN: 978-0-7803-6363-2 * paragraph [0002]; Figures 2,3 *.

Wittmann David et al: "Improving lidar data evaluation for object detection and tracking using a priori knowledge and sensorfusion", 2014 11th International Conference on Informatics in Control, Automation and Robotics (ICINCO), Scitepress, vol. 1, Sep. 1, 2014 (Sep. 1, 2014), pp. 794-801, XP032740360, DOI: 10.5220/0005117707940801 [found on Feb. 25, 2015], *Figures 2-4. 7*.

Wolfgang Schulz: "Passages", Algorithmische Auswertung Von Lidar-Distanzdaten: Anwendung Und Vergleich Von Algorithmen Zur Sicherheitsgerichteten Auswertung Von 2D Laserscanner-Entfernungsdaten, VDM Verlag, DE, pp. 37-110, Jan. 1, 2005 (Jan. 1, 2005), XP009519461, ISBN: 978-3-639-06283-0, URL:http://babylon.internal.epo.org/projects/babylon/ev1.nsf/0/BCD35A2E2F26B4AEC125853100246848/$FILE/Algorithmische%20Auswertung%20von%20Lidar-Distanzdaten%20Anwendung%20un.pdf, *p. 59 Fig. 3.12, p. 67, Fig. 3.18, p. 68 Fig. 3.19, p. 75 Fig. 3.27, p. 81 Fig. 3.35, p. 100 Fig. 4.19 *.

German Office Action dated Jan. 17, 2022 corresponding to application No. 102019101737.8.

* cited by examiner

METHOD OF MONITORING A PROTECTED ZONE

CROSS-REFERENCE TO RELATED APPLICATION

The present Patent Application claims priority to German Patent Application No. DE102019101737.8, filed Jan. 24, 2019, which is assigned to the assignee hereof and filed by the inventors hereof and which is incorporated by reference herein.

FIELD

The present invention relates to a method and to a control system for monitoring a protected zone of a vehicle and to a vehicle having a control system for monitoring a protected zone of the vehicle.

BACKGROUND

Methods and control systems for monitoring a protected zone of a vehicle are inter alia used to safeguard automated guided vehicles (AGVs). The protected zone is here detected by at least one environmental sensor and a penetration of an object, for example of a person, into the protected zone is detected by the environmental sensor. If the penetration of an object into the protected zone is determined and if the protected zone is thereby infringed, a changeover of the vehicle into a safe state takes place, for example an emergency stop of the vehicle. In particular optical systems, for example laser scanners, are used as environmental sensors. Specifications for the monitoring of protected zones, in particular of vehicles, are laid down in different safety standards.

The protected zone can be fixed as a buffer zone between the environmental sensor and a boundary contour (e.g. a wall or a pallet) spaced apart from the environmental sensor and extending, for example, between the environmental sensor and the boundary contour. A monitoring of the protected zone can then take place in that the boundary zone is scanned by the environmental sensor and an arrangement of scanned points determined in the scanning is checked in a tolerance band arranged around the boundary contour. A distance sensor can in particular be used as the environmental sensor on such a boundary monitoring.

The protected zone or the boundary contour is normatively fixed before the monitoring of the protected zone as a rule. A plurality of protected zones can also be fixed in advance and stored in the control system, with the protected zones being able to differ in shape, orientation or size. A switch over is made between the predefined protected zones in dependence on position and/or time during the operation of the vehicle. If the protected zone is defined by a boundary contour spaced apart from the environmental sensor, a plurality of boundary contours can be stored and a change between the stored boundary contours can be made dynamically, for example dependent on the position. The boundary contours are typically created and stored before putting the vehicle into operation. This has the consequence that changes of the boundary contour that occur during the run time of a control system for monitoring the protected zone can result in an unwanted safety response.

It is the object of the invention to provide a method of monitoring a protected zone, a control system for monitoring a protected zone, and a vehicle having such a control system that make it possible to monitor the protected zone as flexibly as possible.

SUMMARY

This object is satisfied by a method, by a control system, and by a vehicle in accordance with the independent claims. Further developments are respectively given in the dependent claims.

A method of monitoring a protected zone of a vehicle, wherein the protected zone is bounded at least regionally by a boundary contour comprises the following steps:
  positioning the vehicle at a teaching zone comprising the boundary contour;
  teaching a reference contour by means of measuring the boundary contour by an environmental sensor arranged at the vehicle; and
  monitoring the protected zone based on the reference contour and on measured values detected by the environmental sensor.

Since the reference contour that is used in the monitoring of the protected zone by the environmental sensor is only taught when the vehicle is positioned at the boundary contour, it is possible to react flexibly to changes of the boundary contour. The boundary contour can in particular be dynamically adapted or taught during the operation of the vehicle. It is furthermore also possible to fix a protected zone with reference to a boundary contour unknown prior to the putting into operation of the vehicle. It has therefore been recognized within the framework of the invention that a protected zone bounded by a boundary contour can be particularly flexibly monitored if the reference contour is only taught during the operation on site and in particular directly before the monitoring of the protected zone.

The boundary contour can be predefined by a wall or a surface arranged spaced apart from the environmental sensor. The boundary contour can in particular be predefined by an outer contour of a load to be picked up by the vehicle or of another environmental object positioned in the environment of the vehicle.

The protected zone can be given by a buffer zone that is located or extends between the environmental sensor and a boundary contour arranged spaced apart from the environmental sensor. A monitoring of the protected zone takes place in that the boundary contour is scanned by the environmental sensor and the measured values acquired in this process are compared with measured reference values predefined by the reference contour. The measured values comprise scanned points determined in the scanning.

The protected zone can be monitored in that an arrangement of the scanned points represented by the measured values is checked in a tolerance band arranged around the reference contour. In such a contour monitoring, a distance sensor can in particular be used as the environmental sensor and the measured values can represent distance values from objects detected in the direction of the boundary contour. The tolerance band in this case describes a still permitted variation of the distance values in the environment of the reference contours. An object arranged between the boundary contour and the environmental sensor has the result on the monitoring of the protected zone that the scanned points represented by the measured values are arranged outside the tolerance band. An infringement of the protected zone can be concluded from this and a safety reaction can be triggered.

The vehicle can be positioned at the teaching zone during the teaching of the reference contour, for example, such that the vehicle is positioned at a predefined safety distance from the boundary contour. The teaching zone can in particular comprise a zone surrounding the boundary contour up to the safety distance or can be formed by such a zone. The vehicle can in particular be positioned on a side of the teaching zone disposed opposite the boundary contour. The predefined safety distance can, for example, be predefined in that a hazard for an object arranged between the vehicle and the boundary contour, in particular a person arranged between the vehicle and the boundary contour, is precluded during the teaching. The vehicle can in particular be positioned spaced apart from the boundary contour in a teaching position. The positioning of the vehicle at the teaching zone in particular takes place before the teaching of the reference contour. The vehicle can be positioned at the teaching zone during the teaching of the reference contour such that the predefined reference contour is not fallen below.

The positioning of the vehicle at the teaching zone and the teaching of the reference contour can in particular take place during the run time of a control program controlling the vehicle in normal operation. The control program can, for example be stored on a control system controlling the vehicle and can be carried out by the control system during the run time. A positioning command can, for example, be transmitted to the control system during the run time of the control program and the positioning of the vehicle at the teaching zone is carried out on the basis of said positioning command. The positioning command can, for example, be a drive command with coordinates of a position or pose of the vehicle arranged at the teaching zone, in particular with coordinates of the teaching position or of a teaching pose. The pose or the teaching pose of the vehicle here describes both the position of the vehicle in space and its orientation. The pose can also be called the location or orientation of the vehicle. The teaching zone and/or the safety distance can alternatively or additionally also be predefined for the control system.

The vehicle can in particular be configured as an automated guided vehicle (AGV). In addition to the environmental sensor, the vehicle can also comprise further environmental sensors that are used to monitor the protected zone. The boundary contour can in particular be measured by a plurality of environmental sensors on the teaching of the reference contour and the protected zone can be monitored based on measured values of the plurality of environmental sensors.

The environmental sensor can be configured as a distance sensor, in particular as an optical distance sensor, and the measured values can represent distance values from objects placed in front of the environmental sensor. The distance sensor can determine the distance values by means of a time of flight measurement. The distance sensor can in particular be configured as a laser scanner. The environmental sensor can scan the monitored zone, for instance in a two-dimensional protected plane. The environmental sensor can also scan the monitored zone in a three-dimensional protected volume.

In a further development of the method, the teaching comprises the following steps:
  detecting environmental sensor data by means of the environmental sensor from the teaching zone;
  deriving a measurement contour from the environmental sensor data;
  checking a consistency of the measurement contour; and
  storing the measurement contour as the reference contour for monitoring the protected zone if the measurement contour is consistent.

Since the measurement contour derived from the environmental sensor data is checked for consistency before the storing as a reference contour, it can be ensured that only a correctly detected measurement contour that correctly represents the boundary contour is stored as the reference contour.

During the detection of the environmental sensor data, the environmental sensor arranged at the vehicle is oriented such that the teaching zone, in particular the boundary contour, is at least partly arranged in a detection zone of the environmental sensor. The environmental sensor data represent taught measured values with respect to objects arranged in the teaching zone, in particular taught measured values with respect to the boundary contour arranged in the teaching zone. Together with the teaching measured values, measured position values can be detected that represent the pose of the vehicle, in particular the position of the vehicle, during the detection of the teaching measured values. The measured position values can represent the pose of the vehicle in a global coordinate system of a working zone traveled by the vehicle.

After the detection of the environmental sensor data and optionally of the measured position values, the measurement contour can be derived by means of a scan matching process. In the scan matching process, the structures represented by the environmental sensor data and detected by the environmental sensor are placed over one another in the best possible manner, for example while taking account of absolute positions determined from the measured position values. The structures can, for example, be placed over one another such that differences between overlapping sections of the structures are minimized.

The measurement contour is in particular consistent when the structures placed over one another coincide or only have slight differences from one another. The measurement contour can, for example, be consistent when the differences between the structures or between overlapping sections of the structures are smaller than a predefined limit value.

In a further development of the method, the monitoring comprises the following steps:
  aligning the environmental sensor to the boundary contour;
  reading in the measured values detected by the environmental sensor; and
  comparing the measured values with the stored reference contour.

The movements of a vehicle comprising the environmental sensor can thereby be secured particularly simply with respect to the boundary contour. The comparison of the measured values with the stored reference contour can take place, for example, in that the arrangement of the scanned point represented by the measured values is checked in the tolerance band surrounding the reference contour and an arrangement of individual scanned points or of a plurality of scanned points outside the tolerance band is determined. The measured values and the reference contour, as well as the tolerance band surrounding the reference contour, can each be processed in a representation in the global coordinates of the working zone of the vehicle on the comparison of the measured values with the stored reference contour. The reference contour and/or the tolerance can additionally be stored in global coordinates of the working zone.

A further development of the method comprises a performance of a movement of the vehicle endangering the protected zone. The monitoring of the protected zone takes place during the performance of the movement and the performance of the movement is stopped when the measured values differ from the reference contour. The teaching of the reference contour can in particular take place and can preferably be concluded before the performance of the movement endangering the vehicle is started. Since the reference contour at least partly bounding the protected zone is taught on site and before performing the movement, the movement of the vehicle can be secured particularly flexibly.

A movement of the vehicle endangers the protected zone when it represents a hazard for objects or persons located in the protected zone. The movement of the vehicle endangering the protected zone can be a movement of the total vehicle. The movement endangering the protected zone can, for example, be a movement of the vehicle in the direction of the boundary contour by which the buffer zone between the vehicle and the boundary contour is reduced in size. The movement endangering the protected zone can also comprise a movement of a vehicle part of the vehicle. The vehicle part can, for example, be a load pick-up device of the vehicle, for instance a pallet fork. The movement of the vehicle endangering the protected zone can in particular comprise a picking up of the load by the vehicle. The stopping of the performance of the movement represents a safety response.

A further development of the method comprises a holding of the vehicle in a safe state after the positioning of the vehicle at the teaching zone and the teaching of the reference contour takes place while the vehicle is in the safe state. It can thereby be ensured that an endangering of objects arranged in the protected zone of the vehicle is precluded during the teaching of the reference contour.

The vehicle can be held in the safe state in that a movement of the vehicle is restricted, for example completely prohibited or only permitted with a safely monitored movement pattern. The safely monitored movement pattern can, for example, comprise a safely reduced speed, acceleration, or similar. The safely monitored movement pattern can also comprise a restriction of the movement to safe positions, for example a restriction of the movement such that the vehicle safely maintains the safety distance from the boundary contour.

In a further development of the method, the boundary contour is predefined by an environmental object variably positionable in a working zone of the vehicle. The environmental object can be an object, for example a warehouse article or a further vehicle, placed in the working zone. The boundary contour can be predefined by a section of an outer contour of the environmental object. The section can, for example, be arranged in an intersection, in particular in a sectional plane, of the environmental object with the detection zone of the environmental sensor. The section can also comprise the complete outer contour of the environmental object.

Since the protected zone is bounded by a boundary contour defined by the environmental object, an intermediate space arranged between the environmental object and the vehicle can be monitored as the protected zone and the vehicle can safely approach the environmental object.

In alternative further developments, the boundary contour can also be predefined by a structure, for example a wall or similar, statically bounding a working zone of the vehicle.

In a further development of the method, the environmental object is formed by a load to be picked up by the vehicle. Since the reference contour is taught by measuring the load forming the environmental object, a protected zone flexibly adapted to the load can be defined. The outer contours of the environmental object can frequently only be poorly defined in advance, in particular with a load to be picked up by the vehicle, for example when the load is bulk cargo arranged on carriers, for instance pallets.

In a further development of the method, a plurality of environmental sensor data sets having environmental sensor data are detected and the derivation of the measurement contour comprises a creation of part contours from the individual environmental sensor data sets and a spatial superposition of the part contours. Since the measurement contour is derived from a superposition of a plurality of part contours, the measurement contour can be derived particularly reliably and flexibly.

The boundary contour can also move relative to the environmental sensor during the teaching of the reference contour, for example based on a movement of the boundary contour itself or based on a movement of the environmental sensor, so that this movement can be recognized by the superposition of the part contours and can be taken into consideration in the derivation of the measurement contour. The individual environmental sensor data sets can each comprise environmental sensor data that are detected while the boundary contour and the environmental sensor are located at a constant relative position with respect to one another.

The boundary contour can also be configured such that it cannot be detected by means of an environmental data set determined in an individual measurement of the boundary contour. This can be the case, for example, when the boundary contour is larger than a detection zone of the environmental sensor and/or when the boundary contour has structures, for example undercuts, that the environmental sensor cannot completely detect from a single relative pose.

In a further development of the method, all the part contours are compared with the start contour one after the other, starting from a start contour, in the check of the consistency of the measurement contour.

The start contour is formed by one of the part contours, for example by a randomly selected part contour or by a part contour that was created from the first environmental sensor data set detected in the measurement of the boundary contour. The part contours can be compared with the start contour in that a respective difference between the part contours and the start contour is determined. The difference can, for example, be a mean deviation, for example a deviation determined as a root mean square. On the comparison of the part contours with the start contour, a respective such difference value can be determined for each of the individual part contours.

In a further development of the method, a predefined and stored reference part contour is used as the start contour. The consistency of the measurement contour can thereby be checked in a simple and fast manner. The reference part contour can in particular be stored as an exact part contour, for example as a part contour defined free of measurement errors or noise contributions.

In a further development of the method, the check of the consistency of the measurement contour comprises a calculation of a quality value for the superposition of the part contours and a comparison of the quality value with a predefined threshold value. The measurement contour is consistent when the quality value falls below the predefined threshold value. The quality value can be derived from one of the difference values that are determined in the comparison of the part contours with the start contour. The quality value can in particular be derived from all the difference values, for example as a mean value of the difference values, for instance as a root mean square or as a median of the difference values.

The quality value can also comprise difference values that are determined on a comparison of two or more part contours different from the start contour. For example, a plurality of respective difference values can be determined pairwise for every pair of part contours, in particular pairwise for every pair of part contours arranged overlapping one another. To check the consistency of the reference contour, the individual difference values of the pairs of part contours can be compared with a respective threshold value. A mean difference value can, however, also be formed as a mean value of the difference values of the individual pairs of part contours and can be compared with the threshold value. The consistency can be determined when each of the difference values or the mean difference value falls below the threshold value.

In a further development of the method, the vehicle is arranged at different spatial poses during the measurement of the boundary contour. The boundary contour can thereby be measured particularly exactly. The vehicle can in particular be arranged at different spatial poses during the detection of the environmental sensor data of the individual environmental sensor data sets.

In a further development of the method, the method comprises a detection of pose data representing the different spatial poses and the pose data are taken into consideration in the check of the consistency of the measurement contours. The consistency of the measurement contour can thereby be checked particularly safely and fast.

The pose data can in particular represent measured poses of the vehicle. The pose data can respectively be associated with the individual environmental sensor data sets determined with a constant relative pose between the environmental sensor and the boundary contour. The pose data can be detected by means of a position sensor arranged at the vehicle. The position sensor can be an absolute position sensor for detecting the pose of the vehicle in a global coordinate system of the working zone of the vehicle or a relative position sensor for detecting a relative pose change on a movement of the vehicle and can, for example, be configured as an odometer.

The pose data can be taken into consideration in the check of the consistency of the measurement contour in that a conclusion is drawn from the measurement contour on the different spatial poses at which the vehicle is arranged during the measurement of the boundary contour, in particular in the detection of the individual environmental sensor data sets, and a coincidence with the spatial poses represented by the pose data is checked.

In a further development of the method, the consideration of the pose data in the check of the consistency of the measurement data comprises a derivation of poses of the vehicle derived from the measurement of the boundary contour and a comparison of the derived poses of the vehicle with measured poses of the vehicle represented by the pose data. The derived poses can in particular be derived from the environmental sensor data acquired in the measurement of the boundary contour. For example, a respective derived pose can be determined for each of the individual environmental sensor data sets. The derived poses can also each only be derived as pose changes that the vehicle performs between the detection of the individual environmental sensor data sets and can be compared with pose changes derived from the pose data. This can in particular take place when the pose data are respectively only detected as relative pose data, for example by means of a relative position sensor.

In summary, the teaching of the reference contour can comprise a positioning of the vehicle in a first pose and a positioning of the vehicle in a second pose. The teaching of the reference contour can furthermore comprise a reading of first environmental sensor data and first pose data in the first pose and a reading of second environmental sensor data and second pose data in the second pose. The teaching can additionally comprise a derivation of a first part contour from the first environmental sensor data and a derivation of a second part contour from the second environmental sensor data as well as a spatial superposition of the first part contour and the second part contour.

The teaching of the reference contour can subsequently comprise a determination of a first difference value between the first part contour and the start contour and a determination of a second difference value between the second part contour and the start contour. Alternatively or additionally, the teaching of the reference contour can also comprise a determination of a difference value between the first part contour and the second part contour from the superposition of the first part contour and the second part contour. The teaching of the reference contour can furthermore comprise a determination of the quality value from the first difference value and from the second difference value by, for example, mean value formation to average the first and second distance values and a comparison of the quality value with a predefined threshold value.

Additionally or alternatively to the determination of the quality value, the teaching of the reference contour can also comprise a determination of a first determined pose and a determination of a second determined pose from the superposition of the first and second part contours, with the first determined pose representing a pose of the vehicle during the reading of the first environmental sensor data and the second determination pose representing a pose of the vehicle during the reading of the second environmental sensor data. The teaching of the reference contour can then comprise a first pose comparison of the first determined pose with a first measured pose of the vehicle determined from the first pose data and a second pose comparison of the second determined pose with a second measured pose of the vehicle determined from the second pose data. The measurement contour is stored as a reference contour when a difference between the first determined pose and the first measured pose as well as a difference between the second determined pose and the second measured pose are each smaller than a predefined limit value.

The first and second pose comparisons can also take place in that a determined pose change that the vehicle performs between the first and second determined poses and a measured pose change that the vehicle performs between the first and second measured poses is derived and a pose change comparison is carried out to determine a difference between the determined pose change and the measured pose change. The measurement contour is stored as a reference contour when a difference between the determined pose change and the measured pose change falls below a predefined limit value.

In a further development of the method, the teaching of the measurement contour comprises a recognition of an interference object arranged in the teaching zone. The interference object can in particular be arranged between the environmental sensor and the boundary contour. The interference object can, for example, be an interference object moving through the teaching zone. The interference object can in particular be a person standing in the teaching zone or a person passing through the teaching zone. The interference object can be recognized by a comparison of the environmental sensor data detected on the measurement of the boundary contour with stored interference object data.

In a further development of the method, the interference object is recognized on the basis of its shape, its movement, and/or its reflection properties. The stored interference object data can in particular comprise information with respect to the shape, the movement, and/or the reflection properties of the interference object. The shape of the interference object can be predefined by a characteristic contour of the interference object; with a persons, for example, by a characteristic contour of the legs of the person (two approximately cylindrical objects next to one another). The movement of the interference object can be predefined by a characteristic movement pattern of the interference object; with a person, for example, by a pendular movement of the legs of the person.

In a further development of the method, the taught reference contour is prepared without the interference object. The reference contour can thereby also be taught when the interference object is arranged within the teaching zone at times or permanently during the teaching. The reference contour can in particular be created without the interference object in that the boundary contour is measured from different positions or at different times such that sections of the boundary contour are also detected that are covered by the interference object in one position or in a plurality of positions or at one or more times.

In a further development of the method, the environmental sensor is configured as a distance sensor, preferably as an optical distance sensor. The measured values and/or the environmental sensor data can then in particular comprise distance values measured by the environmental sensor.

In a further development of the method, remission values acquired in the measurement of the boundary contour are stored in the reference contour and the measured values comprise measured remission values that are detected in the protected zone and that are compared with the remission values of the reference contour on the monitoring of the protected zone. The reference contour can thereby be monitored particularly reliably.

A control system for monitoring a protected zone of a vehicle using an environmental sensor arrangeable at the vehicle and using a control device is additionally provided, with the protected zone being at least regionally bounded by a boundary contour. A driving mode, a teaching mode, and a monitoring mode are stored in the control device and the control device comprises a positioning module, a teaching module, and a monitoring module. The positioning module is adapted to position the vehicle at a teaching zone including the boundary contour in the driving mode. The teaching module is configured to teach a reference contour by means of measurement of the boundary contour by the environmental sensor in the teaching mode. The monitoring module is configured to monitor the protected zone on the basis of the reference contour and of measured values detected by the environmental sensor in the monitoring mode.

The control system is in particular configured to carry out the method of monitoring a protected zone of a vehicle provided as part of the invention. The control device can in particular be configured to control the vehicle or a drive of the vehicle. The control device is configured to change between the driving mode, the teaching mode, and the monitoring mode during the run time of a control program controlling the vehicle in normal operation. In normal operation, the vehicle is controlled in an automated manner using the control program and using the configuration and initialization data stored in the control device. The configuration and initialization data are determined before the start of normal operation and are stored in the control device.

The control device can be implemented on one or on a plurality of logic units. The logic units can be configured as microcontrollers, FPGAs, ASICs, or similar. The positioning module and/or the teaching module and/or the monitoring module can be implemented as software modules of control software of the logic units. The logic units of the control device can be implemented at the vehicle, in a data processing device connected to the vehicle via a data connection and arranged outside the vehicle or in a distributed manner at the vehicle and in the data processing device arranged outside the vehicle.

In a further development of the control system, the teaching module is formed in an integrated manner in the environmental sensor. The teaching module can in particular be implemented on a logic module of the environmental sensor.

In a further development of the control system, the teaching module is formed separately from the vehicle, preferably as a server-based service on a server device connected to the monitoring module via a data connection. Such a server device can in particular provide a higher processing power and storage capacity than a control unit arranged at the vehicle.

A vehicle is additionally provided havening a control system in accordance with the invention for monitoring a protected zone of the vehicle.

BRIEF DESCRIPTION OF THE DRAWINGS

The invention will be explained in the following with reference to Figures. There are shown in a schematic representation in each case.

DETAILED DESCRIPTION

Figure 1:
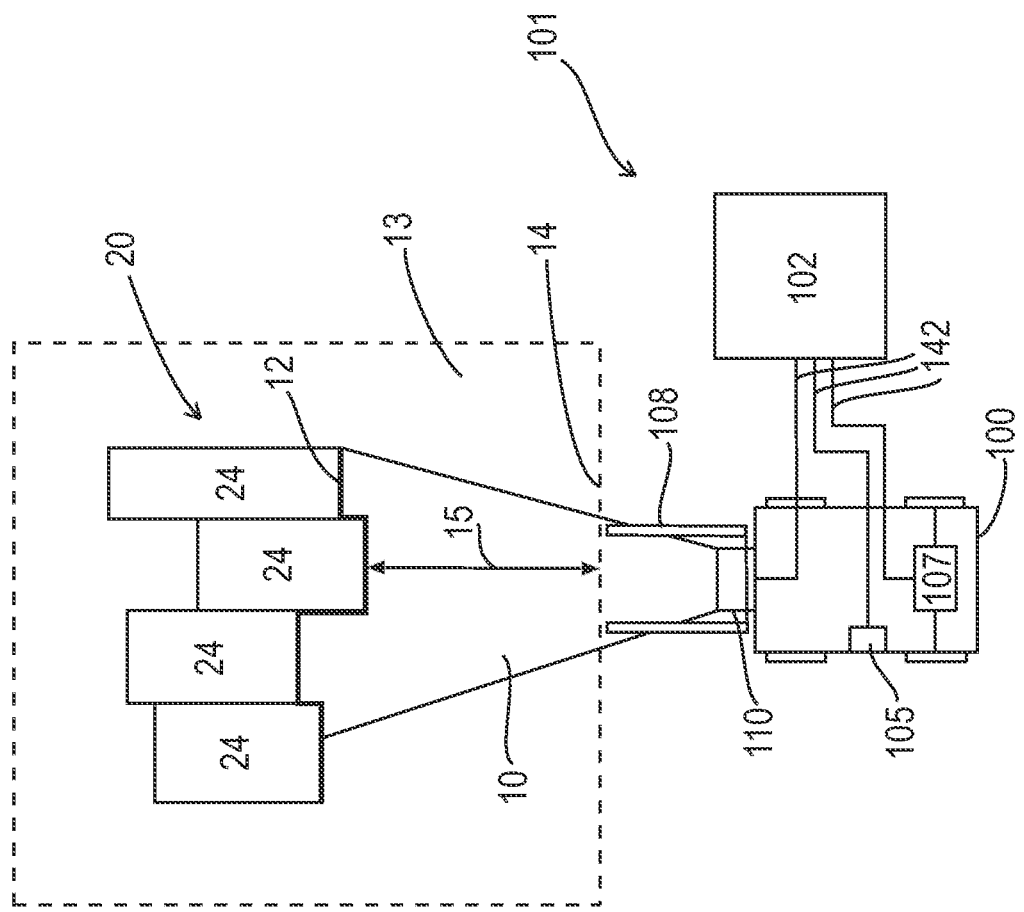
FIG. 1 a vehicle having a control system for monitoring a protected zone.

FIG. 1 shows a vehicle 100 having a control system 101 for monitoring a protected zone 10 of the vehicle 100. The protected zone 10 is arranged in a direction of travel in front of the vehicle 100. The vehicle 100 comprises an environmental sensor 110 for monitoring the protected zone 10. The protected zone 10 is arranged within a detection zone of the environmental sensor 110 and is bounded by a boundary contour 12 at a side disposed opposite the environmental sensor 110.

The boundary contour 12 is predefined by an environmental object 20 variably positionable in a working zone of the vehicle 100. The environmental object 20 is a load 24 to be picked up by the vehicle 100, with the load 24 comprising individual load materials. The load 24 can be arranged on a pallet, for example. The vehicle 100 comprises a load pick-up device 108 to pick up the load 24.

The vehicle 100 is configured as an AGV and movements of the vehicle 100 are controlled in an automated manner by a control device 102 of the control system 101. Driving movements of the vehicle 100 to drive the vehicle 100 within a working zone of the vehicle 100 and movements of the load pick-up device 108 are in particular controlled by the control devices 102. The controlled movements of the vehicle 100 each represent a movement of the vehicle 100 endangering the protected zone 10. The environmental sensor 110, a position sensor 105, and a drive 107 of the vehicle are connected to the control device 102 via one or more data connections 142. Sensor data generated by the environmental sensor 110 are transmitted from the environmental sensor 110 to the control device 102 via the one data connection 142 or the plurality of data connections 142, pose data representing a pose of the vehicle and generated by the position sensor 105 are transmitted from the position sensor 105 to the control device 102, and drive data controlling the drive 107 are transmitted from the control device 102 to the drive 107.

The boundary contour 12 is arranged within a teaching zone 13. The environmental object 20 predefined by the boundary contour 12 is in particular arranged within the teaching zone 13. The teaching zone 13 extends over a safety distance 15 before the boundary contour 12. The safety distance 15 can, for example, indicate a smallest distance between the environmental object 20 and a side 14 of the teaching zone 13 disposed opposite the boundary contour 12.

Figure 2:
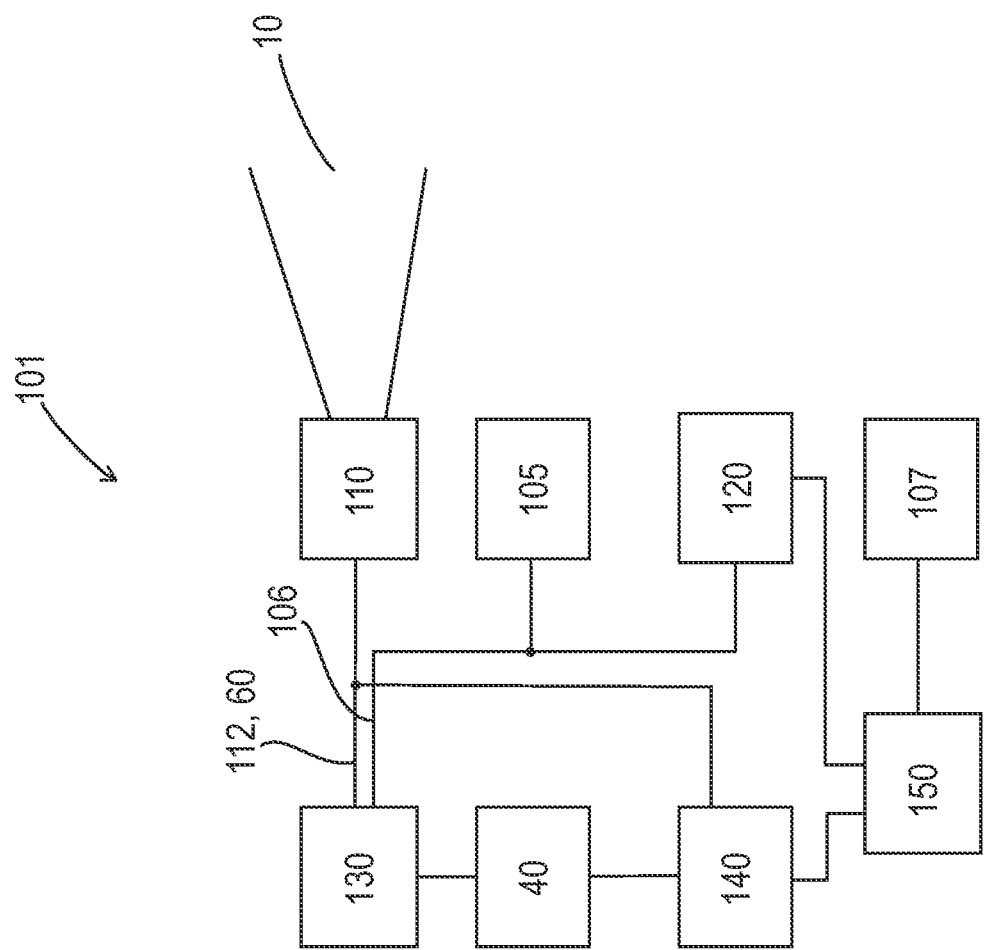
FIG. 2 the control system having a teaching module, a monitoring module, and a positioning module.

FIG. 2 shows the control system 101. The control system 101 comprises a positioning module 120, a teaching module 130, and a monitoring module 140 of the control system 101. The positioning module 120 is connected to a drive module 150 to control the drive 107 of the vehicle 100. The positioning module 120 is configured to transmit control commands for controlling the drive 107 to the drive module 150. The drive module 150 is configured to control the drive 107 on the basis of the control commands. The drive 107 can be configured as an electric motor and the drive module 150 can be configured to generate drive currents of the electric motor on the basis of the control commands.

The positioning module 120 is additionally connected to the position sensor 105 and receives the pose data 106 representing a pose of the vehicle 100 from the position sensor 105. The positioning module 120 regulates the pose of the vehicle 100 with reference to the pose data 106.

The teaching module 130 is connected both to the environmental sensor 110 and to the position sensor 105 and receives the pose data 106 from the position sensor 106 and the environmental sensor data 112 from the environmental sensor 110. The teaching module 130 is configured to teach a reference contour 40 in that it measures the boundary contour 12 by means of the environmental sensor 110. The teaching module 130 is additionally configured to store the reference contour 40 in the control system 101.

The monitoring module 140 is configured to monitor the protected zone 10 on the basis of the reference contour 40 and of measured values 60 detected by the environmental sensor 110. The monitoring module 140 is connected to the environmental sensor 110 to transmit the measured values 60. In addition, the monitoring module 140 is adapted to access the reference contour 40 stored by the teaching module 130. The monitoring module 140 is adapted to monitor the protected zone 10 in that it compares the measured values 60 with the stored reference contour 40. If the measured values 60 differ from the reference contour 40, the monitoring module 140 is adapted to stop the performance of the movement controlled by the drive module 150. The monitoring module 140 can, for example, be connected to the drive module 150 and can be adapted to interrupt an energy supply of the drive module 150 to stop the movement.

Figure 3:
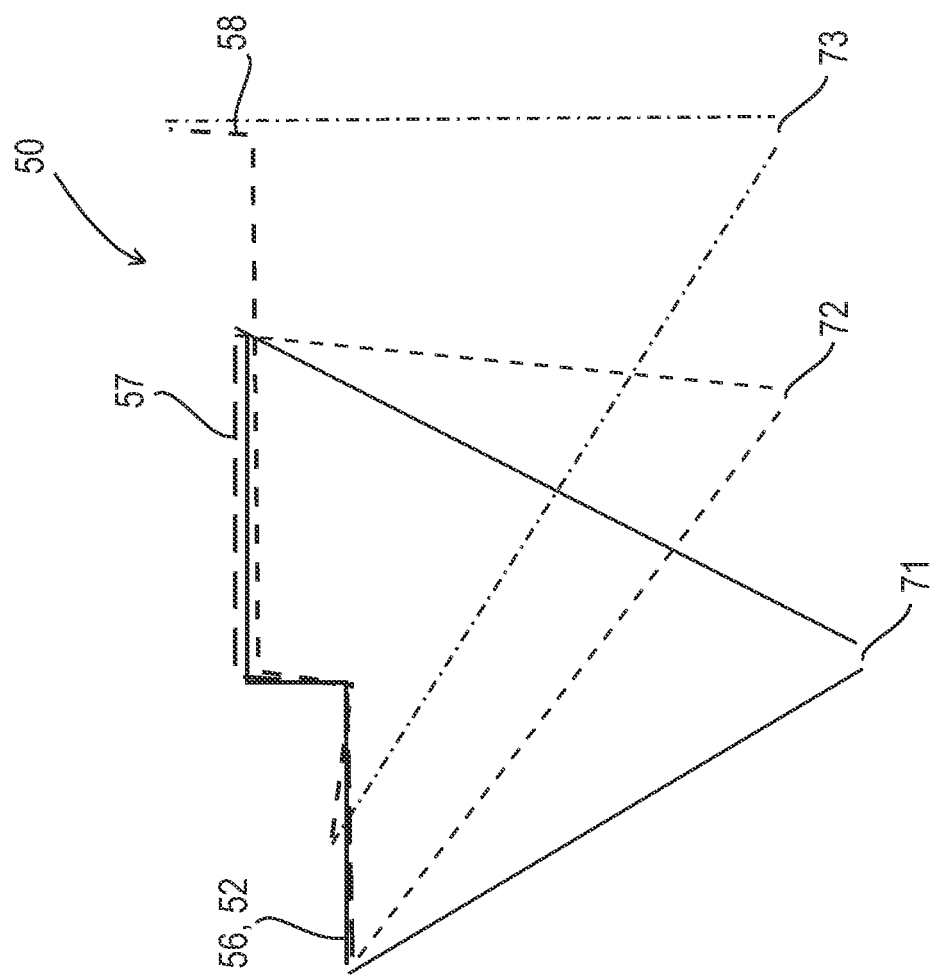
FIG. 3 part contours of a boundary contour of the protected zone.

FIG. 3 shows a first part contour 56, a second part contour 57, and a third part contour 58 that are superposed to form a measurement contour 50. The first part contour 112 is generated from first environmental sensor data 112 that are detected while the vehicle 100 is in a first pose 71. The second part contour 57 is generated from second environmental sensor data 112 that are detected in a second pose 72 of the vehicle 100 and the third part contour 58 is generated from third environmental sensor data 112 that are detected in a third pose 73 of the vehicle 100. The first, second, and third poses 71, 72, 73 respectively differ from one another, both with respect to the position of the vehicle 100 and with respect to the orientation of the vehicle 100. The first environmental sensor data 112 form a first environmental sensor data set, the second environmental sensor data 112 form a second environmental sensor data set, and the third environmental sensor data 112 form a third environmental sensor data set. On the check of the consistency of the measurement contour 50, the first part contour 56 is defined as a start contour 52 and the second part contour 57 and the third part contour 58 are compared with the first part contour 56 forming the start contour 52.

Figure 4:
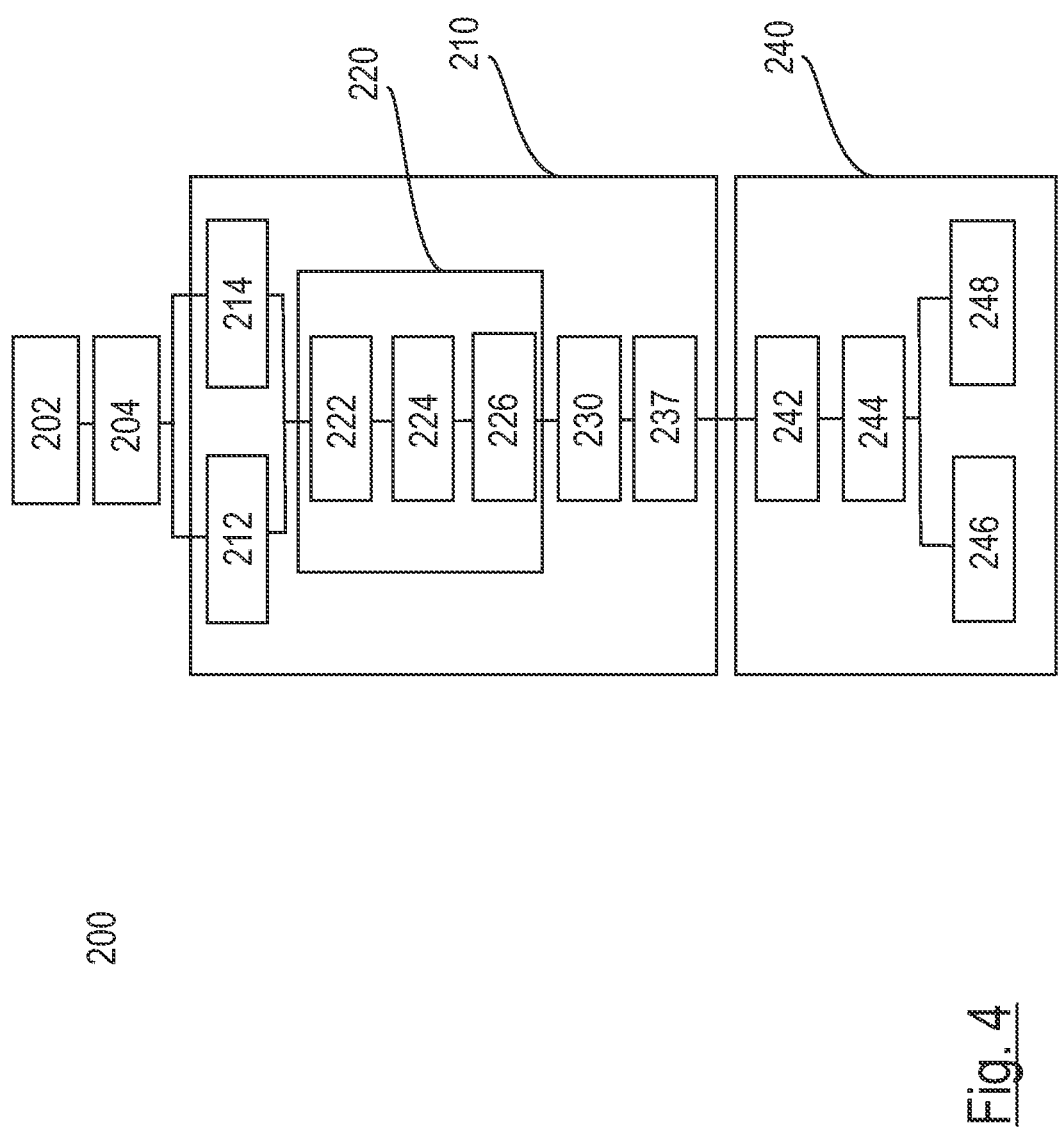
FIG. 4 a method of monitoring the protected zone of the vehicle.

FIG. 4 shows a method 200 for monitoring the protected zone 10 of the vehicle 100. The method 200 starts with a positioning 202 of the vehicle 100 at the teaching zone 13. The method 200 furthermore comprises a holding 204 of the vehicle 100 in a safe state as soon as the vehicle 100 is positioned at the teaching zone 13. The method 200 subsequently comprises a teaching 210 of the reference contour 40 while the vehicle 100 is held in the safe state.

The teaching 210 of the reference contour 40 comprises a detection 212 of the environmental sensor data 112 and a detection 214 of the pose data 106 respectively associated with the environmental sensor data 112. The teaching 210 furthermore comprises a derivation 220 of the measurement contour 50 from the environmental sensor data 112, a subsequent check 230 of the consistency of the measurement contour 50 with reference to the pose data 106, and a storing 237 of the measurement contour 50 as the reference contour 40.

The derivation 220 of the measurement contour 50 comprises a creation 222 of the part contours 56, 57, 58 and a spatial superposition 224 of the part contours 56, 57, 58 to form the measurement contour 50. The derivation 220 of the measurement contour 50 additionally comprises a recognition 226 of an interference object arranged in the teaching zone 13.

The method 200 furthermore comprises, after the teaching 210 of the reference contour 40, a monitoring 240 of the protected zone 10 based on the reference contour 40 and on the measured values 60 detected by the environmental sensor 110. The monitoring 240 of the protected zone 10 in turn comprises a reading 242 of the measured values 60 generated by the environmental sensor 110 and a comparison of the measured values 60 with the stored reference contour 40. If the measured values 60 coincide with the stored reference contour 40, if, for example, the measured values 60 are disposed within a tolerance band comprising the reference contour 40, a performance 246 of a movement of the vehicle 100 endangering the protected zone 10 takes place. If the measured values 60 differ from the stored reference contour 40, if, for example, the measured values 60 are disposed outside the tolerance band, a shift 248 of the vehicle 100 into a safe state takes place, for example, a stopping of the performance 246 of the movement of the vehicle 100. The monitoring 240 of the protected zone 10, in particular the reading 242 of the measured values 60, and the comparison 244 of the measured values 60 with the reference contour 50 can be continuously repeated.

Figure 5:
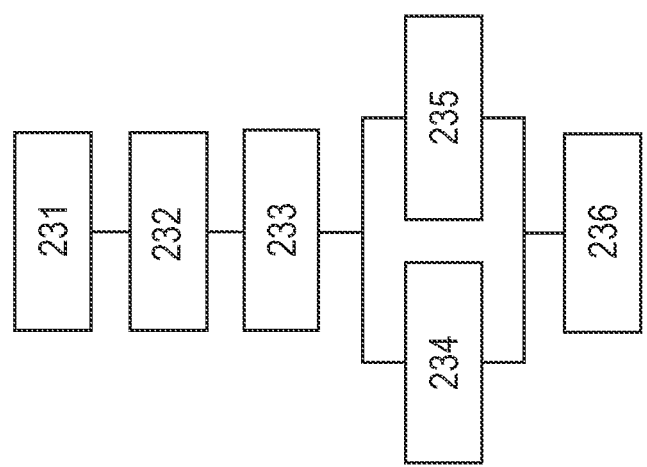
FIG. 5 a check of a consistency of a measurement contour.

FIG. 5 shows the check 230 of the consistency of the measurement contour 50. The check 230 comprises a comparison 231 of the second and third part contours 57, 58 with the first part contour 56 forming the start contour 52, a calculation 232 of a quality values, and a comparison 233 of the quality value with the threshold value 54. The check 230 of the consistency of the measurement contour 50 additionally comprises a derivation 234 of poses of the vehicle 100 derived from the measurement of the boundary contour 12 and a derivation 235 of measured poses from the pose data 106. The check 230 of the consistency of the measurement contour 50 furthermore comprises a comparison 236 of the derived poses and of the measured poses.

Figure 6:
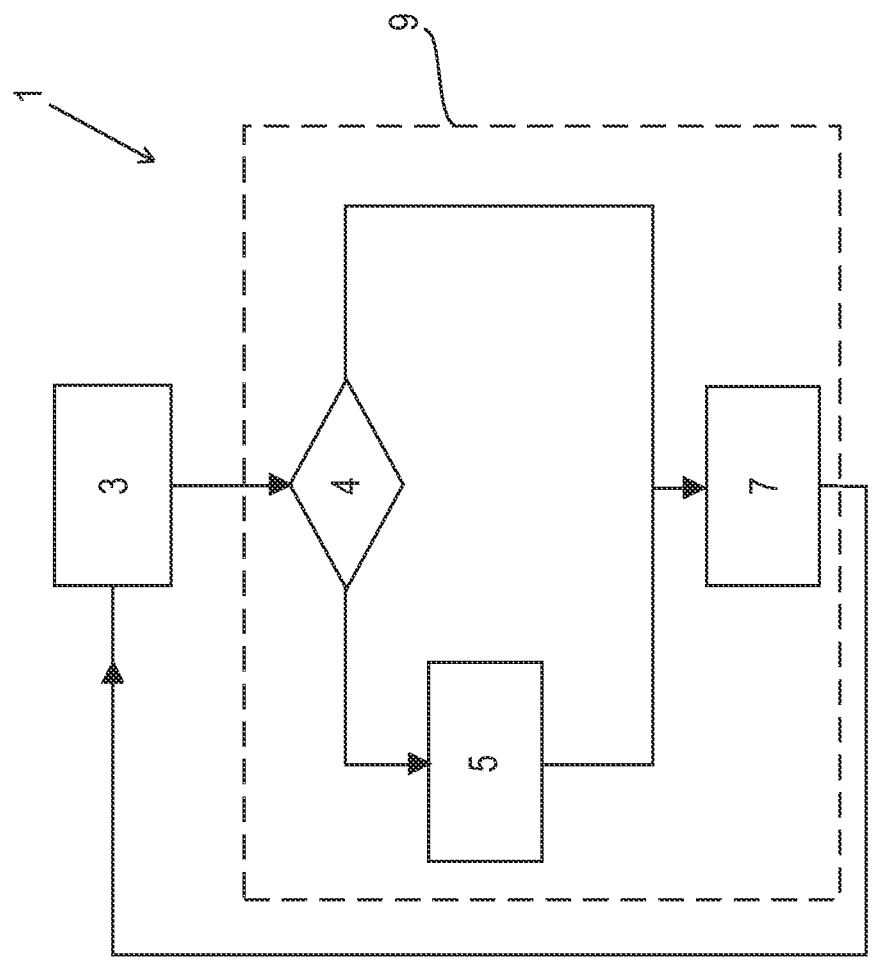
FIG. 6 a control workflow to control the vehicle.

FIG. 6 shows a control workflow 1 for the control of the vehicle 100. The control workflow 1 is carried out by the control system 101, in particular by the control device 102 of the control system 101, during the normal operation of the vehicle 100. The control workflow 1 is stored in a control program controlling the vehicle 100 in the control device 102. The control workflow 1 comprises a driving mode 3 and a safeguarding mode 9 with a teaching mode 5 and a monitoring mode 7. The driving mode 3, the safeguarding mode 9, the teaching mode 5, and the monitoring mode 7 are thus each stored in the control device 102.

The control device 102 can be switched from the driving mode 3 into the safeguarding mode 9. The movement of the vehicle 100 is controlled in the safeguarding mode 9 while safeguarding with respect to the reference contour 40. In the safeguarding mode 9, a reference contour query 4 first takes place in which a check is made whether the reference contour 40 has already been stored and is valid. If this is the case, the control device 102 switches directly into the monitoring mode 7 in which the monitoring module 140 monitors the protected zone 10. If the reference contour 40 is not stored or is invalid, the control device 102 switches into the teaching mode 5 in which the teaching module 130 teaches the reference contour 40 by means of the measurement of the boundary contour 12. The control device 102 can switch back from the safeguarding mode 9, in particular from the monitoring mode 7, into the driving mode 3. The movement of the vehicle 100 is controlled in the driving mode 3 without safeguarding with respect to the reference contour 40.

The control workflow 1, and in particular the switches between the driving mode 3, the safeguarding mode 9, and the switches between the teaching mode 5 and in the monitoring mode 7 of the safeguarding mode 9 are carried out in an automated manner on the basis of the control program stored in the control device 102. The automated performance of the control workflow 1 can take place while considering input data of the control system 101 read into the control device 102.

REFERENCE NUMERAL LIST 1 control workflow
3 driving mode
4 reference contour query
5 teaching mode
7 monitoring mode
9 safeguarding mode
10 protected zone
12 boundary contour
13 teaching zone
14 side
15 safety distance
20 environmental object
24 load material
40 reference contour
50 measurement contour
52 start contour
54 threshold value
56 first part contour
57 second part contour
58 further part contour
60 measured value
71 first pose
72 second pose
73 third pose
100 vehicle
101 control system
102 control device
105 position sensor
106 pose data
107 drive
108 load pick-up device
110 environmental sensor
112 environmental sensor data
120 positioning module
130 teaching module
131 server device
140 monitoring module
142 data connection
150 drive module
200 method
202 positioning
204 holding in a safe state
210 teaching
212 detecting environmental sensor data
214 detecting pose data
220 deriving a measurement contour
222 creating part contours
224 spatial superposition of the part contours
226 recognizing an interference object
230 check of a consistency of a measurement contour
231 comparison with start contour
232 calculation of a quality value
233 comparison of the quality value with a threshold value
234 deriving derived poses
235 deriving measured poses
236 comparison of the derived poses and the measured poses
237 storing
240 monitoring
242 reading measured values
244 comparison of the measured values
246 performing a hazardous movement
248 moving into a safe state

The invention claimed is:

1. A method of monitoring a real-world protected zone of a real-world vehicle,
wherein the protected zone is at least regionally bounded by a boundary contour;
wherein the method comprises the following steps:
positioning the vehicle at a teaching zone comprising the boundary contour;

teaching a reference contour by means of measuring the boundary contour by a real-world environmental sensor arranged at the vehicle and storing the reference contour;
monitoring the protected zone on the basis of the reference contour and on measured values detected by the environmental sensor,
and wherein the monitoring of the protected zone comprises:
reading in the measured values detected by the environmental sensor;
comparing the measured values with the taught reference contour; and
transferring the vehicle into a safe state, by restricting movement of the vehicle, if the measured values are disposed outside a tolerance band arranged around the taught reference contour.

2. The method in accordance with claim 1,
wherein the teaching comprises the following steps:
detecting environmental sensor data by means of the environmental sensor from the teaching zone;
deriving a measurement contour from the environmental sensor data;
checking a consistency of the measurement contour; and
storing the measurement contour as the reference contour for monitoring the protected zone if the measurement contour is consistent.

3. The method in accordance with claim 2,
wherein a plurality of environmental sensor data sets are detected using environmental sensor data;
and wherein the deriving of the measurement contour comprises a creation of part contours from the individual environmental sensor data sets; and a spatial superposition of the part contours to form the measurement contour.

4. The method in accordance with claim 3,
wherein all the part contours are compared with the start contour one after the other, starting from a start contour, in the check of the consistency of the measurement contour.

5. The method in accordance with claim 4,
wherein a predefined and stored reference contour is used as the start contour.

6. The method in accordance with claim 1,
wherein the monitoring comprises the following steps:
aligning the environmental sensor to the boundary contour;
reading in the measured values detected by the environmental sensor; and
comparing the measured values with the stored reference contour.

7. The method in accordance with claim 1,
wherein the method comprises performing a movement of the vehicle endangering the protected zone;
wherein the monitoring of the protected zone takes place during the performance of the movement;
and wherein the performance of the movement is stopped when the measured values differ from the reference contour.

8. The method in accordance with claim 1,
wherein the method comprises a holding of the vehicle in a safe state after the positioning of the vehicle at the teaching zone;
and wherein the teaching of the reference contour takes place while the vehicle is in the safe state.

9. The method in accordance with claim 1,
wherein the boundary contour is predefined by an environmental object variably positionable in a working zone of the vehicle.

10. The method in accordance with claim 6,
wherein the environmental object is formed by a load to be picked up by the vehicle.

11. The method in accordance with claim 1,
wherein the vehicle is arranged at different spatial poses during the measurement of the boundary contour.

12. The method in accordance with claim 1,
wherein the teaching comprises the following steps:
detecting environmental sensor data by means of the environmental sensor from the teaching zone;
deriving a measurement contour from the environmental sensor data;
checking a consistency of the measurement contour; and
storing the measurement contour as the reference contour for monitoring the protected zone if the measurement contour is consistent
wherein the vehicle is arranged at different spatial poses during the measurement of the boundary contour.
wherein the method comprises a detection of pose data representing the different spatial poses;
and wherein the pose data are considered in the check of the consistency of the measurement contour.

13. The method in accordance with claim 12,
wherein the consideration of the pose data in the check of the consistency of the measurement contour comprises:
deriving poses of the vehicle derived from the measurement of the boundary contour; and
comparing the derived poses of the vehicle with measured poses of the vehicle represented by the pose data.

14. The method in accordance with claim 1,
wherein the teaching of the measurement contour comprises a recognition of an interference object arranged in the teaching zone.

15. The method in accordance with claim 14,
wherein the interference object is recognized on the basis of at least one of its shape, its movement, and its reflection properties.

16. The method in accordance with claim 14,
wherein the taught reference contour is created without the interference object.

17. The method in accordance with claim 1,
wherein remission values acquired in the measurement of the boundary contour are stored in the reference contour;
wherein the measured values comprise measured remission values detected in the protected zone; and
wherein the remission values are compared with the remission values of the reference contour in the monitoring of the protected zone.

18. A method of monitoring a real-world protected zone of a real-world vehicle,
wherein the protected zone is at least regionally bounded by a boundary contour;
wherein the method comprises the following steps:
positioning the vehicle at a teaching zone comprising the boundary contour;
teaching a reference contour by means of measuring the boundary contour by a real-world environmental sensor arranged at the vehicle;

monitoring the protected zone on the basis of the reference contour and on measured values detected by the environmental sensor, wherein the monitoring of the protected zone comprises:
reading in the measured values detected by the environmental sensor;
comparing the measured values with the taught reference contour; and
transferring the vehicle into a safe state if the measured values are disposed outside a tolerance band arranged around the taught reference contour, wherein the teaching comprises the following steps:
detecting environmental sensor data by means of the environmental sensor from the teaching zone;
deriving a measurement contour from the environmental sensor data;
checking a consistency of the measurement contour; and
storing the measurement contour as the reference contour for monitoring the protected zone if the measurement contour is consistent.

wherein a plurality of environmental sensor data sets are detected using environmental sensor data;

wherein the deriving of the measurement contour comprises a creation of part contours from the individual environmental sensor data sets; and a spatial superposition of the part contours to form the measurement contour;

wherein the check of the consistency of the measurement contour comprises:
calculating a quality value for the superposition of the part contours; and
comparing the quality value with a predefined threshold value;

and wherein the measurement contour is consistent when the quality value falls below the predefined threshold value.

19. A real-world control system for monitoring a real-world protected zone of a real-world vehicle having a real-world environmental sensor arrangeable at the vehicle and having a real-world control device,
wherein the protected zone is at least regionally bounded by a boundary contour;
wherein a driving mode, a teaching mode, and a monitoring mode are stored in the control device;
wherein the control device comprises a positioning module, a teaching module, and a monitoring module;
wherein the positioning module is adapted to position the vehicle at a teaching zone comprising the boundary contour in the driving mode;
wherein the teaching module is adapted to teach a reference contour by means of measuring the boundary contour by the environmental sensor in the teaching mode and to store the reference contour;
wherein the monitoring module is configured to monitor the protected zone on the basis of the reference contour and on measured values detected by the environmental sensor in the monitoring mode,
wherein the monitoring of the protected zone comprises:
reading in the measured values detected by the environmental sensor; and
comparing the measured values with the taught reference contour;
and wherein the control system is configured to transfer the vehicle into a safe state, by restricting movement of the vehicle, if the measured values are disposed outside a tolerance band arranged around the taught reference contour.

20. A method of monitoring a protected zone of a vehicle,
wherein the protected zone is at least regionally bounded by a boundary contour;
wherein the method comprises the following steps:
positioning the vehicle at a teaching zone comprising the boundary contour;
teaching a reference contour by means of measuring the boundary contour by an environmental sensor arranged at the vehicle;
monitoring the protected zone on the basis of the reference contour and on measured values detected by the environmental sensor;

wherein the teaching comprises the following steps:
detecting environmental sensor data by means of the environmental sensor from the teaching zone;
deriving a measurement contour from the environmental sensor data;
checking a consistency of the measurement contour; and
storing the measurement contour as the reference contour for monitoring the protected zone if the measurement contour is consistent.

wherein a plurality of environmental sensor data sets are detected using environmental sensor data;

wherein the deriving of the measurement contour comprises a creation of part contours from the individual environmental sensor data sets; and a spatial superposition of the part contours to form the measurement contour;

wherein the check of the consistency of the measurement contour comprises:
calculating a quality value for the superposition of the part contours; and
comparing the quality value with a predefined threshold value;

and wherein the measurement contour is consistent when the quality value falls below the predefined threshold value.

* * * * *